United States Patent
Morrill et al.

(10) Patent No.: US 10,462,846 B2
(45) Date of Patent: *Oct. 29, 2019

(54) MULTI-SERVICE PROVIDER WIRELESS ACCESS POINT

(71) Applicant: CenturyLink Intellectual Property LLC, Denver, CO (US)

(72) Inventors: Robert J. Morrill, Overland Park, KS (US); Charles I. Cook, Louisville, CO (US)

(73) Assignee: CenturyLink Intellectual Property LLC, Broomfield, CO (US)

(*) Notice: Subject to any disclaimer, the term of this patent is extended or adjusted under 35 U.S.C. 154(b) by 40 days.

This patent is subject to a terminal disclaimer.

(21) Appl. No.: 15/857,274

(22) Filed: Dec. 28, 2017

(65) Prior Publication Data

US 2018/0146508 A1 May 24, 2018

Related U.S. Application Data

(63) Continuation of application No. 14/808,973, filed on Jul. 24, 2015, now Pat. No. 9,872,339, which is a
(Continued)

(51) Int. Cl.
*H04W 88/10* (2009.01)
*H04L 12/46* (2006.01)
(Continued)

(52) U.S. Cl.
CPC ......... *H04W 88/10* (2013.01); *H04L 12/4633* (2013.01); *H04L 12/4641* (2013.01); *H04M 15/51* (2013.01); *H04W 48/18* (2013.01)

(58) Field of Classification Search
None
See application file for complete search history.

(56) References Cited

U.S. PATENT DOCUMENTS

| | | |
|---|---|---|
| 4,775,997 A | 10/1988 | West, Jr. et al. |
| 4,989,230 A | 1/1991 | Gillig et al. |

(Continued)

FOREIGN PATENT DOCUMENTS

EP   1225775   7/2002

OTHER PUBLICATIONS

US 9,125,233 B2, 09/2015, Morrill et al. (withdrawn)
(Continued)

*Primary Examiner* — Anh Ngoc M Nguyen

(57) ABSTRACT

Novel tools and techniques that can provide wireless service for multiple service providers from a single, multi-service provider wireless access point. In an aspect, a multi-service provider wireless access point might communicate with a plurality of wireless devices, each associated with a different wireless carrier, and route communications from each device to the appropriate carrier (and/or, similarly, transmit communications from each carrier to the appropriate wireless device). In this way, for example, a single wireless access point could provide service to cellphones of subscribers of a number of different carriers. Such a wireless access point can provide enhanced efficiency and reduced cost, along with the ability to provide higher service for a number of wireless carriers.

19 Claims, 9 Drawing Sheets

Related U.S. Application Data continuation of application No. 13/827,163, filed on Mar. 14, 2013, now Pat. No. 9,392,641, which is a continuation-in-part of application No. 13/541,839, filed on Jul. 5, 2012, now Pat. No. 9,497,800.

(51) Int. Cl.
*H04M 15/00* (2006.01)
*H04W 48/18* (2009.01)

(56) References Cited

U.S. PATENT DOCUMENTS

| | | | |
|---|---|---|---|
| 5,202,765 | A | 4/1993 | Lineberry |
| 5,526,403 | A | 6/1996 | Tam |
| 5,635,980 | A | 6/1997 | Lin et al. |
| 5,740,075 | A | 4/1998 | Bigham et al. |
| 5,771,465 | A | 6/1998 | Bojeryd |
| 5,784,683 | A | 7/1998 | Sistanizadeh et al. |
| 5,815,208 | A | 9/1998 | Samuela et al. |
| 5,889,954 | A | 3/1999 | Gessel et al. |
| 5,923,379 | A | 7/1999 | Patterson |
| 5,971,921 | A | 10/1999 | Timbel |
| 5,983,068 | A | 11/1999 | Tomich et al. |
| 6,012,100 | A | 1/2000 | Frailong et al. |
| 6,069,899 | A | 5/2000 | Foley |
| 6,209,025 | B1 | 3/2001 | Bellamy |
| 6,240,553 | B1 | 5/2001 | Son et al. |
| 6,282,189 | B1 | 8/2001 | Earnes |
| 6,359,973 | B1 | 3/2002 | Rahamim et al. |
| 6,438,596 | B1 | 8/2002 | Ueno et al. |
| 6,542,500 | B1 | 4/2003 | Gerszberg et al. |
| 6,640,239 | B1 | 10/2003 | Gidwani |
| 6,687,374 | B2 | 2/2004 | Leuca et al. |
| 6,882,714 | B2 | 4/2005 | Mansfield |
| 6,898,413 | B2 | 5/2005 | Yip et al. |
| 7,114,169 | B1 | 9/2006 | Kahn |
| 7,123,700 | B1 | 10/2006 | Weaver et al. |
| 7,283,505 | B1 | 10/2007 | Meenan et al. |
| 7,369,838 | B1 | 5/2008 | Murray et al. |
| 7,617,317 | B2 | 11/2009 | Jones et al. |
| 7,631,047 | B1 | 12/2009 | Adamcyzk et al. |
| 7,673,321 | B2 | 3/2010 | Yurt et al. |
| 7,792,996 | B2 | 9/2010 | Monette et al. |
| 8,050,281 | B2 | 10/2011 | Casey et al. |
| 8,082,353 | B2 | 12/2011 | Huber et al. |
| 8,086,271 | B2 | 12/2011 | Dent |
| 8,127,011 | B2 | 2/2012 | Monette |
| 8,213,384 | B2 | 7/2012 | Breuer et al. |
| 8,447,332 | B2 | 5/2013 | Weinreich et al. |
| 8,490,129 | B2 | 7/2013 | Phillips et al. |
| 8,537,814 | B2 | 9/2013 | Phillips et al. |
| 8,713,617 | B2 | 4/2014 | Phillips et al. |
| 9,392,641 | B2 | 7/2016 | Morrill et al. |
| 9,497,800 | B2 | 11/2016 | Cook |
| 9,591,602 | B2 | 3/2017 | Bamburak |
| 9,743,462 | B2 | 8/2017 | Cook |
| 9,872,339 | B2 | 1/2018 | Morrill et al. |
| 2001/0012319 | A1 | 8/2001 | Foley |
| 2002/0013847 | A1 | 1/2002 | Fisher et al. |
| 2002/0021465 | A1 | 2/2002 | Moore et al. |
| 2002/0037004 | A1 | 3/2002 | Bossemeyer et al. |
| 2002/0063924 | A1 | 5/2002 | Kimbrough et al. |
| 2002/0087724 | A1 | 7/2002 | Datta et al. |
| 2002/0101858 | A1 | 8/2002 | Stuart et al. |
| 2002/0110115 | A1 | 8/2002 | Gorman et al. |
| 2002/0124247 | A1 | 9/2002 | Houghton |
| 2003/0026416 | A1 | 2/2003 | Fusco |
| 2003/0078962 | A1 | 4/2003 | Fabbricatore |
| 2003/0106067 | A1 | 6/2003 | Hoskins |
| 2004/0008761 | A1 | 1/2004 | Keliher et al. |
| 2004/0044736 | A1 | 3/2004 | Austin-Lane et al. |
| 2004/0078457 | A1 | 4/2004 | Tindal |
| 2004/0100975 | A1 | 5/2004 | Kreiner et al. |
| 2004/0136373 | A1 | 7/2004 | Bareis |
| 2004/0181692 | A1* | 9/2004 | Wild ............... H04W 48/14 726/4 |
| 2004/0213286 | A1 | 10/2004 | Jette et al. |
| 2005/0071882 | A1 | 3/2005 | Rodriguez et al. |
| 2005/0097356 | A1* | 5/2005 | Zilliacus ........ H04W 36/0066 726/4 |
| 2005/0266720 | A1 | 12/2005 | Lin |
| 2006/0068793 | A1 | 3/2006 | Van Lieshout et al. |
| 2006/0191005 | A1 | 8/2006 | Muhamed et al. |
| 2007/0097956 | A1 | 5/2007 | Okmianski et al. |
| 2007/0247262 | A1 | 10/2007 | Park |
| 2008/0081557 | A1 | 4/2008 | Murray et al. |
| 2008/0160984 | A1 | 7/2008 | Benes et al. |
| 2009/0131023 | A1 | 5/2009 | Lorello |
| 2009/0141694 | A1* | 6/2009 | Shi ................ H04L 41/0806 370/338 |
| 2009/0182768 | A1 | 7/2009 | Stevens et al. |
| 2009/0201830 | A1 | 8/2009 | Angelot et al. |
| 2010/0027482 | A1 | 2/2010 | Murakami et al. |
| 2010/0082775 | A1 | 4/2010 | Banga et al. |
| 2010/0195562 | A1 | 8/2010 | Ishizu |
| 2011/0131338 | A1 | 6/2011 | Hu |
| 2001/0299626 | | 12/2011 | Kim Byoung-Hoon et al. |
| 2012/0027145 | A1 | 2/2012 | Uyehara et al. |
| 2012/0045012 | A1 | 2/2012 | Alapuranen |
| 2012/0077492 | A1 | 3/2012 | Bamburak et al. |
| 2012/0095826 | A1 | 4/2012 | Baur et al. |
| 2012/0254349 | A1 | 10/2012 | Quigley et al. |
| 2012/0264450 | A1* | 10/2012 | Kangas ............. G01S 5/0226 455/456.1 |
| 2013/0155849 | A1 | 6/2013 | Koodli et al. |
| 2013/0235874 | A1 | 9/2013 | Ringdahl et al. |
| 2013/0273962 | A1 | 10/2013 | Phillips et al. |
| 2013/0308470 | A1 | 11/2013 | Bevan et al. |
| 2013/0329745 | A1 | 12/2013 | Phillips et al. |
| 2013/0333016 | A1 | 12/2013 | Coughlin et al. |
| 2014/0010149 | A1 | 1/2014 | Cook |
| 2014/0010171 | A1 | 1/2014 | Morrill et al. |
| 2014/0050167 | A1 | 2/2014 | Smedman et al. |
| 2014/0233951 | A1 | 8/2014 | Cook |
| 2014/0321858 | A1 | 10/2014 | Cook |
| 2015/0334647 | A1 | 11/2015 | Morrill et al. |
| 2017/0041985 | A1 | 2/2017 | Cook |

OTHER PUBLICATIONS

ATM access network architecture; Meada, Y.; Kikuchi, K.; Tokura, N.: Communications, 1991. ICC 91, Conference Record; IEEE International Conference on Jun. 23-26, 1991; Pates 687-691 vol. 2; Digital Object Identifier 1031109/ICC.1991.162450.

Frank, Edward and Holloway, Jack; "Connecting the Home with a Phone Line Network Chip Set," IEEE Micro, Mar.-Apr. 2000, pp. 2-14.

NextNet Wireless, NextNet Expedience, NLOS Plug-and-Play Portable Customer Premise Equipment Integrated Radio Modem, Non Line-of-Sight Broadband Wireless Residential Subscriber Unit (RSU-2510A), http://www.nextnetwireless.com/assets/news/media/PDF/rsu_2510.

* cited by examiner

200
MULTI-SERVICE PROVIDER WIRELESS ACCESS POINT

CROSS-REFERENCE TO RELATED APPLICATIONS

This application is a continuation of U.S. patent application Ser. No. 14/808,973, filed Jul. 24, 2015 by Robert J. Morrill et al. and entitled, "Multi-Service Provider Wireless Access Point", which is a continuation of U.S. patent application Ser. No. 13/827,163 (now U.S. Pat. No. 9,392,641), filed Mar. 14, 2013 by Robert J. Morrill et al. and entitled, "Multi-Service Provider Wireless Access Point", which is a continuation-in-part of U.S. patent application Ser. No. 13/541,839 (now U.S. Pat. No. 9,497,800), filed Jul. 5, 2012 by Charles Ivan Cook and entitled "Multi-Service Provider Wireless Access Point", the entire disclosures of which are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to wireless service provider networks, and more particularly, to tools and techniques that enable a single base station to serve subscribers of multiple service providers.

BACKGROUND

Wireless service providers employ access points (also known in the art as "base stations") to provide wireless service to wireless subscriber devices (such as cell phones, wireless PDAs, wireless tablet computers, wireless modems, and the like). The location of such access points is often constrained by geographic features, local regulation, and/or cost. To address some of these issues, multiple wireless service providers will often collocate base stations, resulting in a single location (such as a tower, building spire, etc.) having multiple antennas, radios, and other base station hardware.

This solution is inefficient because it results in a large degree of hardware redundancy, but it is often unavoidable, for several reasons. For instance, most wireless providers are allocated a discrete frequency band for their exclusive use, and a given wireless provider will employ base station hardware tuned specifically for that provider's allocated spectrum. Additionally, each provider's base station maintains exclusive connectivity with that provider's network. Thus, while the concept of a "shared" access point that can serve multiple wireless providers could provide enhanced efficiencies, both in terms of cost and utilization of limited space in prime locations, the realization of that concept is constrained by significant technical hurdles.

One such hurdle is the disparities in radio frequency ("RF") communications employed by different wireless providers to provide communication between the access point and the subscribers' wireless devices. These disparities include different transmission frequency bands, different modulation schemes, and the like. Another hurdle is the distribution of traffic between a shared access point and the networks of different wireless providers. Using conventional techniques, there is no way to distinguish the traffic of one wireless provider from another. These issues, and others, stand in the way of effective implementation of shared wireless access points.

Hence, there is a need for solutions that can overcome technical hurdles to allow the provision of shared wireless access points.

BRIEF SUMMARY

A set of embodiments offers solutions that can provide wireless service for multiple service providers from a single, multi-service provider wireless access point. In an aspect, a multi-service provider wireless access point might communicate with a plurality of wireless devices, each associated with a different wireless carrier, and route communications from each device to the appropriate carrier (and/or, similarly, transmit communications from each carrier to the appropriate wireless device). In this way, for example, a single wireless access point could provide service to cellphones of subscribers of a number of different carriers. Such a wireless access point can provide enhanced efficiency and reduced cost, along with the ability to provide higher service for a number of wireless carriers.

Various embodiments provide features to enable and enhance such functionality. Merely by way of example, some embodiments feature dedicated communication links between the multi-service provider wireless access point and each of the providers served by the access point. Other embodiments can provide dedicated management platforms to enable each provider to manage that provider's wireless service through the access point. Still other embodiments can provide statistics tracking and billing features to enhance the provision of service for multiple providers through a single access point.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, a method of providing wireless service for multiple service providers from a single access point, in accordance with one set of embodiments, might comprise providing a multi-service provider wireless access point. The access point, in one aspect, might having one or more radios to communicate with wireless devices and an uplink connection to a plurality of wireless service providers. The method might further comprise receiving, at the multi-service provider wireless access point, a communication from a wireless device.

In some embodiments, the method further comprises collecting, e.g., at the multi-service provider wireless access point, an identifier of the wireless device from the communication, and/or identifying, from the identifier of the wireless device, a wireless service provider serving the wireless device. The method might further comprise receiving, at the multi-service provider wireless access point, one or more subsequent communications from the wireless device, and/or routing, from the multi-service provider wireless access point, the one or more subsequent communications to the identified wireless service provider, over the uplink connection.

A method in accordance with other embodiments might comprise providing a multi-service provider wireless access point, which might have one or more radios to communicate with wireless devices and/or an uplink interface to provide an uplink connection to a plurality of wireless service providers. The method might further comprise establishing, for each of the plurality of service providers, a dedicated management platform for each service provider to manage wireless service provided by that service provider. In some embodiments, the method further comprises providing a plurality of dedicated communication links, each of which might providing secure communication between the uplink interface and one of the wireless service providers. In further embodiments, the method could comprise receiving, at the multi-service provider wireless access point, a communication from a wireless device served by a first wireless service provider, and/or transmitting the communication to the first wireless service provider over a first dedicated communication link associated with the first service provider. Merely by way of example, the method described above might be employed to determined how to transmit the communication to the first wireless service provider.

A multi-service provider wireless access point in accordance with another set of embodiments might comprise one or more radios to communicate with wireless devices and an uplink connection to a plurality of wireless service providers. The access point might further comprise one or more processors. In one aspect, there might be a plurality of processors, including one or more processors dedicated to each wireless provider, to provide each provider with a discrete processing system to provide wireless service for each respective service provider's subscribers. In another aspect, the one or more processors might be configured to support a plurality of virtual machines with one or more virtual machines dedicated to each wireless service provider, to provide each wireless service provider with a discrete processing system to provide wireless service for each respective service provider's subscribers.

In some cases, the wireless access point might further comprise a non-transitory machine readable medium having encoded thereon a set of instructions executable by the processor to perform one or more operations, including without limitation instructions to perform operations in accordance with methods provided by various embodiments.

Merely by way of example, in one embodiment, the set of instructions might comprise instructions to receive a communication from a wireless device, and instructions to obtain, from the communication, an identifier of the wireless device. The set of instructions might further include instructions to identify, from the identifier of the wireless device, a wireless service provider serving the wireless device. In some cases, the set of instructions might comprise instructions to receive one or more subsequent communications from the wireless device, and/or instructions to route the one or more subsequent communications to the identified wireless service provider, over the uplink connection. Alternatively and/or additionally, the set of instructions might comprise instructions to establish, for each of the plurality of service providers, a dedicated management console for each service provider to manage wireless service provided by that service provider; instructions to receive a communication from a wireless device assigned to a subscriber of a first wireless service provider; and/or instructions to transmit the communication to the first wireless service provider over a first dedicated communication link associated with the first service provider.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1A:
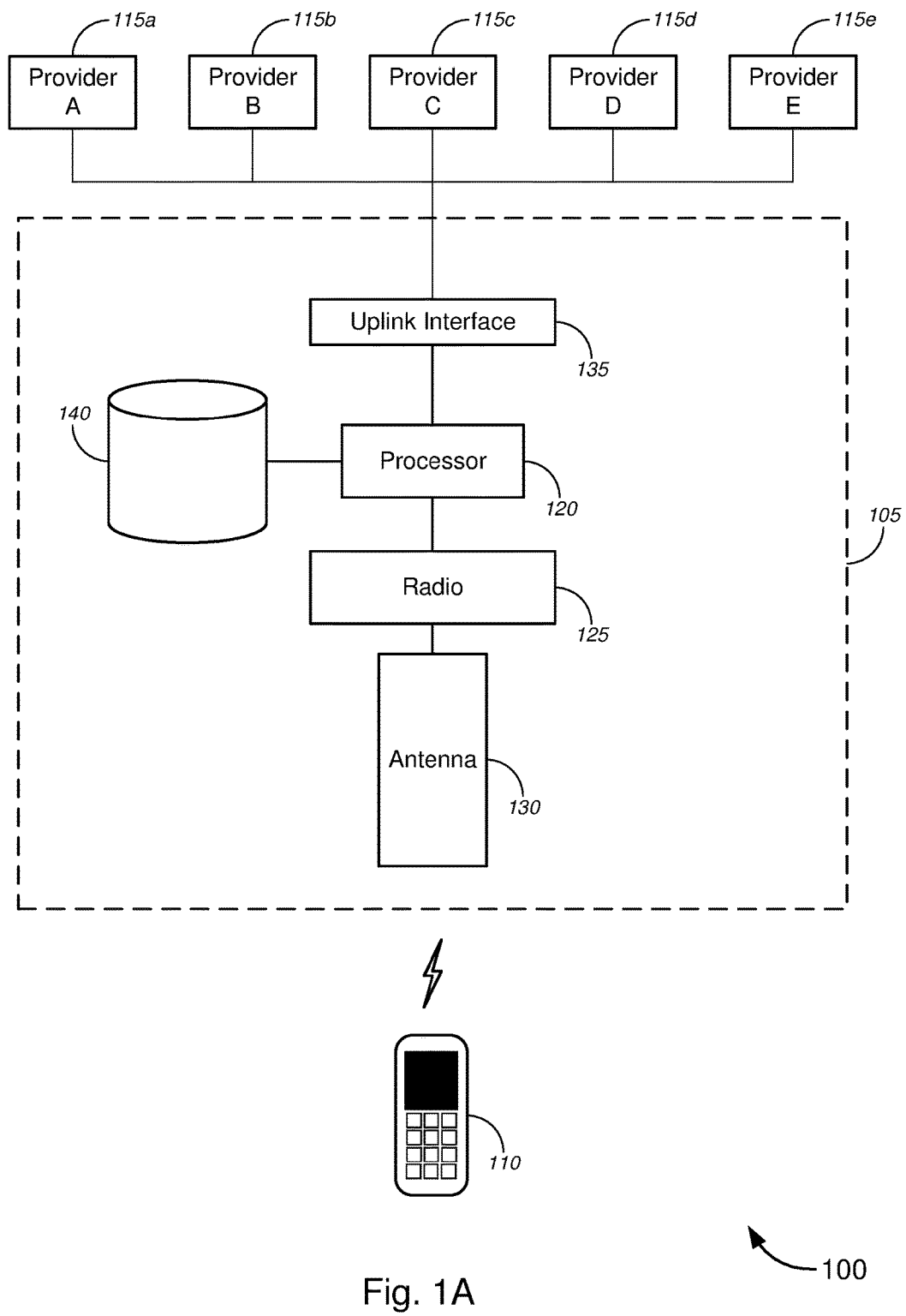
FIGS. 1A-1F are block diagrams illustrating systems for providing wireless services for multiple service providers through a single access point, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

A set of embodiments offers solutions that can provide wireless service for multiple service providers from a single, multi-service provider wireless access point. Thus, instead of requiring multiple access points collocated at the same location (or located near one another), certain embodiments can allow for the installation of a single access point, with substantial efficiencies in cost, space, and aesthetics, while still serving subscribers of multiple service providers. Some embodiments can support different wireless access technologies (code division multiple access ("CDMA"), Global System for Mobile communications ("GSM"), Long Term Evolution ("LTE"), etc.) and/or different frequency bands (e.g., 700 MHz, 1800 MHz, etc.) employed by different carriers using one or more radios in the access point. Some embodiments can support technologies, such as WiFi, developed for and/or deployed in unlicensed spectrum; other embodiments might employ cognitive radio technologies designed to share spectrum, such as "TV White Space" spectrum. Various embodiments can include dedicated hardware components and/or virtual, software-defined components.

In another aspect, a multi-service provider wireless access point might communicate with a plurality of wireless devices, each associated with a different wireless carrier. The access point might feature an uplink connection that provides connectivity with each of the wireless service providers, and the access point might route communications from each device over the uplink connection to the appropriate provider (and/or, similarly, transmit communications from each provider to the appropriate wireless device).

Some aspects of different embodiments provide various features to enable and enhance such functionality. Merely by way of example, some embodiments feature dedicated communication links between the multi-service provider wireless access point and each of the providers served by the access point. These secure links (e.g., virtual private network ("VPN") links can allow for secure transmission of wireless traffic to and from the wireless provider's core network (or an edge router thereof, to be more precise) as well as provide the wireless provider with secure access for management purposes. Each provider's link capacity may be fixed, dynamic or a combination thereof.

Correspondingly, some embodiments can provide dedicated management platforms to enable each provider to manage that provider's wireless service through the access point. In an aspect, the dedicated wireless link for a particular provider can provide access to that provider's management platform. Such management platforms can provide each wireless provider with an interface to configure various parameters related to the wireless service offered by that provider through the access point, such as radio control, implementation of various wireless standards and/or versions thereof (such as 3GPP LTE Release 9, LTE Release 10, etc.), and the like. In another aspect, the management platforms can allow providers to implement radio coordination schemes, for example, so that the multi-provider wireless access point can integrate with each provider's wireless network (and the other base stations/access points implemented by each particular provider in such networks).

Still other embodiments can provide statistics tracking and billing features to enhance the provision of service for multiple providers through a single access point. Merely by way of example, in some embodiments, the access point can be configured to compile a variety of performance statistics and categorize those statistics by provider. The statistics relevant to each provider can then be made available to that provider (e.g., though the management platform, via transmission over the respective dedicated link, etc.). In some cases, these statistics can be used for pricing the cost of the service to the provider (e.g., on a usage basis). In a particular set of embodiments, the access point might be configured to collect statistics even for providers who currently do not use the access point to provide wireless service (e.g., by tracking registration requests or other communications from devices that subscribe to that provider); such statistics can be provided to the non-participating provider as a tool to encourage the provider to offer service through the access point (e.g., by illustrating to the provider how many subscribers could be served better by the access point than by the provider's existing network).

FIG. 1A illustrates a system 100 employing a multi-service provider wireless access point 105 in accordance with one set of embodiments. The multi-service provider wireless access point 105 provides communication between a wireless device 110 and one of a plurality of wireless service providers (carriers) 115. As illustrated by FIG. 1A, the multi-service provider wireless access point 105 comprises a processor 120, which can be programmed with instructions to control the operation of the multi-service provider wireless access point 105, and/or perform operations, as described herein (including causing the multi-service provider wireless access point 105 to operate in accordance with the methods described below). The multi-service provider wireless access point 105 also comprises a wireless radio 125 in communication with the processor 120 and an antenna 130. The radio 125 communicates with the wireless device 110, via the antenna 130 using wireless radio frequency ("RF") signals.

An uplink interface 135 in communication with the processor 120 provides an uplink connection with the plurality of wireless service providers 115, providing connectivity between the multi-service provider wireless access point 105 and the providers 115 (and, ultimately, between the wireless device 110 and one of the providers 115, through the multi-service provider wireless access point 105). The uplink interface 135, as can be appreciated, generally will be specific to the type of uplink connection, and the interface 135 can include whatever hardware and/or software are necessary or appropriate to support the uplink connection, such as an appropriate port, communication chipset, etc. A variety of different uplink connections are possible in accordance with different embodiments. For instance, in some cases, the uplink connection can comprise an Ethernet connection and/or the like. Additionally and/or alternatively, the uplink connection might comprise an optical connection, such as a passive optical network ("PON") circuit, a synchronous optical network ("SONET") ring, and/or the like. Any type of digital access technology, including without limitation digital subscriber line ("DSL"), Data Over Cable Service Interface Specification ("DOCSIS"), etc., can be used to provide the uplink connection, provided the digital access technology has sufficient performance functionality to support the traffic passing through the access point 105.

The uplink connection, in an aspect, might provide connectivity between the multi-service provider wireless access point 105 and a telecommunication provider's core network, which in turn provides connectivity to each of the wireless service providers 115 (e.g., through peering relationships, the Internet, etc.). The telecommunication provider might be, but need not necessarily be, one of the wireless service providers 115. Alternatively and/or additionally, if a wireless service provider 115 has a relationship with a wireline service provider operating the access point 105, it is possible that the wireless service provider 115 could have the access point 105 direct the connection to the wireline or other service provider to perform call processing on behalf of the wireless service provider 115 that actually serves the subscriber. Similarly, if one wireless service provider 115a has a relationship with a second wireless service provider 115b, such that the second service provider 115b has access to necessary authentication information, the second service 115b provider could assume the responsibility of call processing of the original service provider 115a in the case of an emergency by securely informing the multiservice access point via an update to a provider identification database (described below) to route the calls to the second service provider 115b. Alternatively and/or additionally, a single service provider 115 could use a similar database update technique to route calls from the access point 105 to an alternate mobile switching center ("MSC") for load balancing or other reasons.

The multi-service provider wireless access point 105 might also include a computer readable storage medium 140, such as a hard drive, solid state memory, firmware, etc. This medium can store instructions for programming the processor 120 to cause the multi-service provider wireless-access point 105 to operate as described herein. The medium 140 might also have stored thereon one or more databases (or other data stores) as described in further detail below. (Such databases/data stores can also be located in other locations, so long as they are accessible—e.g., via the uplink connection—to the multi-service provider wireless access point 105).

Figure 1B:
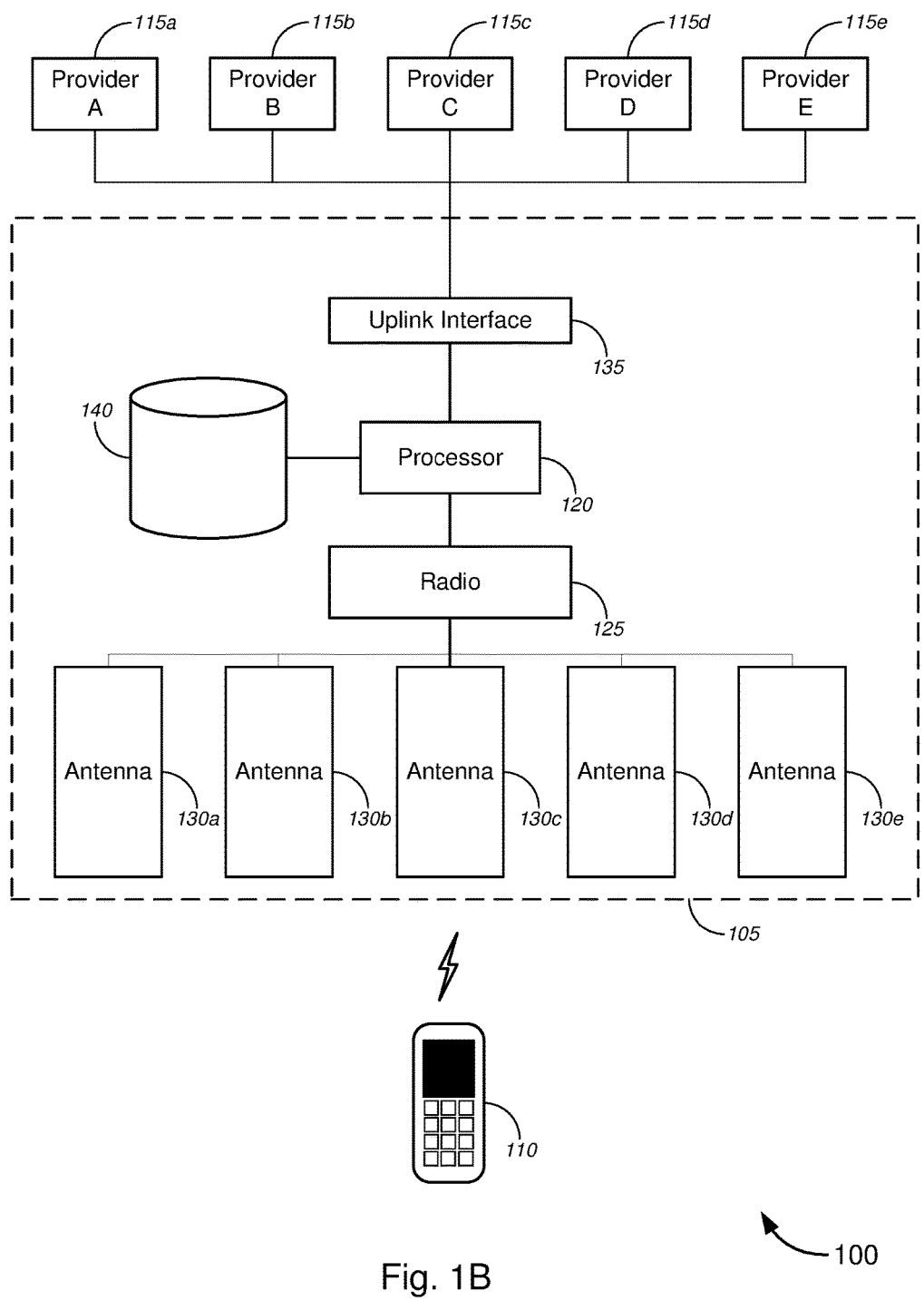
Figure 1C:
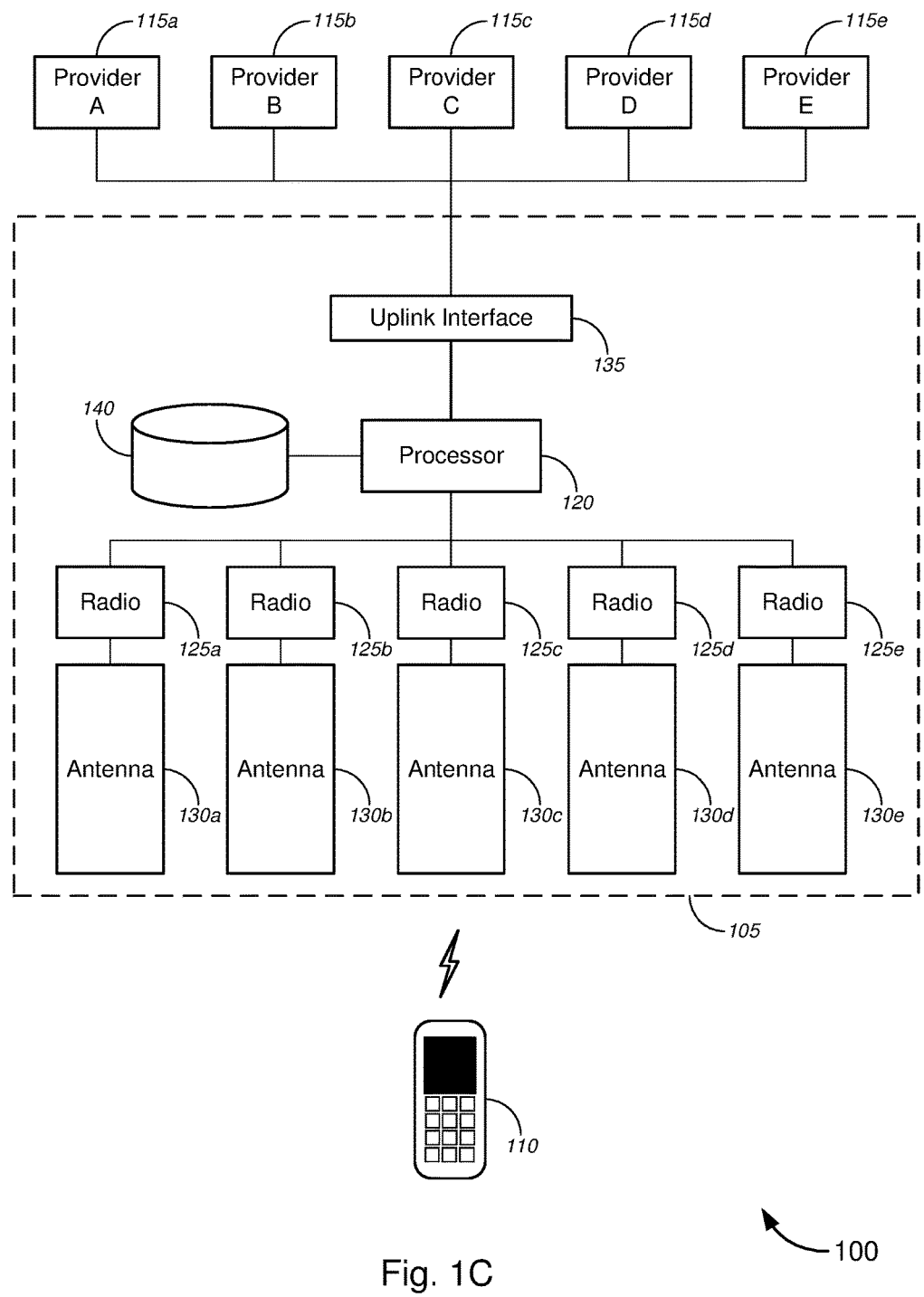

Various embodiments can support a number of different processing architectures and a number of different radio and antenna arrangements. Merely by way of example, FIG. 1A illustrates a multi-service provider wireless access point 105 with a single processor 120, a single radio 125 and a single antenna 130. In other embodiments, as illustrated by FIG. 1B, a multi-service provider wireless access point 105 might comprise a single radio 125 in communication with a plurality of antennas. In further embodiments, as illustrated by FIG. 1C, a multi-service provider wireless access point might comprise a plurality of radios 125, each of which is in communication with one (or more) of a plurality of antennas 130. In an aspect, the use of multiple antennas 130 can enable efficient transmission and reception over a wide range of radio spectrum. In certain embodiments, for example, the processor 120 is programmed to manage which antenna or antennas 130 is used at any given instant of time, either directly or through a switching mechanism.

These different arrangements (as illustrated in non-limiting fashion by FIGS. 1A-1F) can support a number of different configurations that allow the multi-service provider wireless access point 105 to provide wireless service to subscribers of multiple providers 115. Merely by way of example, in the embodiment illustrated by FIG. 1C, each radio 125 might transmit/receive on a frequency band that is allocated to one or more providers 115. For instance, one radio 125a might transmit and receive on the 700/800 MHz band, which is allocated (e.g., by the FCC) to, and/or used by, a first provider 115a. Another radio 125b might transmit and receive on the 1800/1900 MHz band, which might be allocated to, and/or used by, Provider B 115b and Provider C 115c. In other embodiments, different radios 125 might support different modulation and/or access technologies; for example, one radio 125 might communicate using CDMA, while another radio might communicate using GSM, and a third radio might communicate using LTE. Many such arrangements are possible, and embodiments are not limited to the use of licensed spectrum. In an exemplary aspect of some embodiments, unlike conventionally collocated, but separate, access points for different providers, all of the radios are part of the same access point 105, are controlled by the same processor 120 (or processors) and share an uplink interface 135.

In other configurations, such as those illustrated by FIGS. 1A and 1B, a single radio 125 might communicate (i.e., transmit and/or receive) on multiple frequency bands and/or for multiple providers 115. A number of different techniques can be used to provide this functionality. Merely by way of example, in some embodiments, the radio 125 employs orthogonal frequency-division multiple access ("OFDMA") modulation to allow the radio 125 to transmit on multiple bands. In some cases, as illustrated by FIG. 1B, a single radio 125 might communicate through a plurality of antennas 130, and the antennas 130 can be assigned to different sub-bands, such that the radio 125 communicates on a particular sub-band using a particular antenna 130 or antennas. As described in further detail below, the antenna(s) 130 for a particular sub-band might be selected to optimize the performance for that sub-band. Merely by way of example, the antennas 130 might have different lengths and/or different radiating characteristics (e.g., omni-directional, Yagi, etc.), and the length of a particular antenna might be tuned a portion of radio frequency spectrum where it radiates and receives RF energy efficiently.

As noted above, different embodiments support a variety of configurations. For example, some embodiments support multiple carriers (wireless service providers) on the same radio 125 assuming that the carriers are using the same radio technology (e.g., LTE, WiMAX, etc.) and/or employ compatible frequency ranges (even if modulation schemes are different, in some cases). In some such embodiments, this can be done using a base radio 125 that is able to operate over a wide spectrum band and logic to match the appropriate antenna(s) 130 to the radio 125 at the time they are needed. Another set of embodiments, however, can employ a dynamic implementation of a software defined radio ("SDR") as the radio 125. Multiple instances of an SDR can be run by a processor (e.g., the processor 120), and the processor can match the appropriate modulated signal to the appropriate antenna. So Provider A 115a could communicate with its subscribers over LTE using spectrum Aa and Provider B 115b could transmit/receive over WiMAX using spectrum Bb. The processor 120, then, could execute instances of the SDR and map the appropriate antennas 130 to service both providers. The number of SDRs that could be supported might depend on the number of processors (and/or processor cores, virtualized processor instances, etc.) and/or the speed of those processors/instances.

Figure 1D:
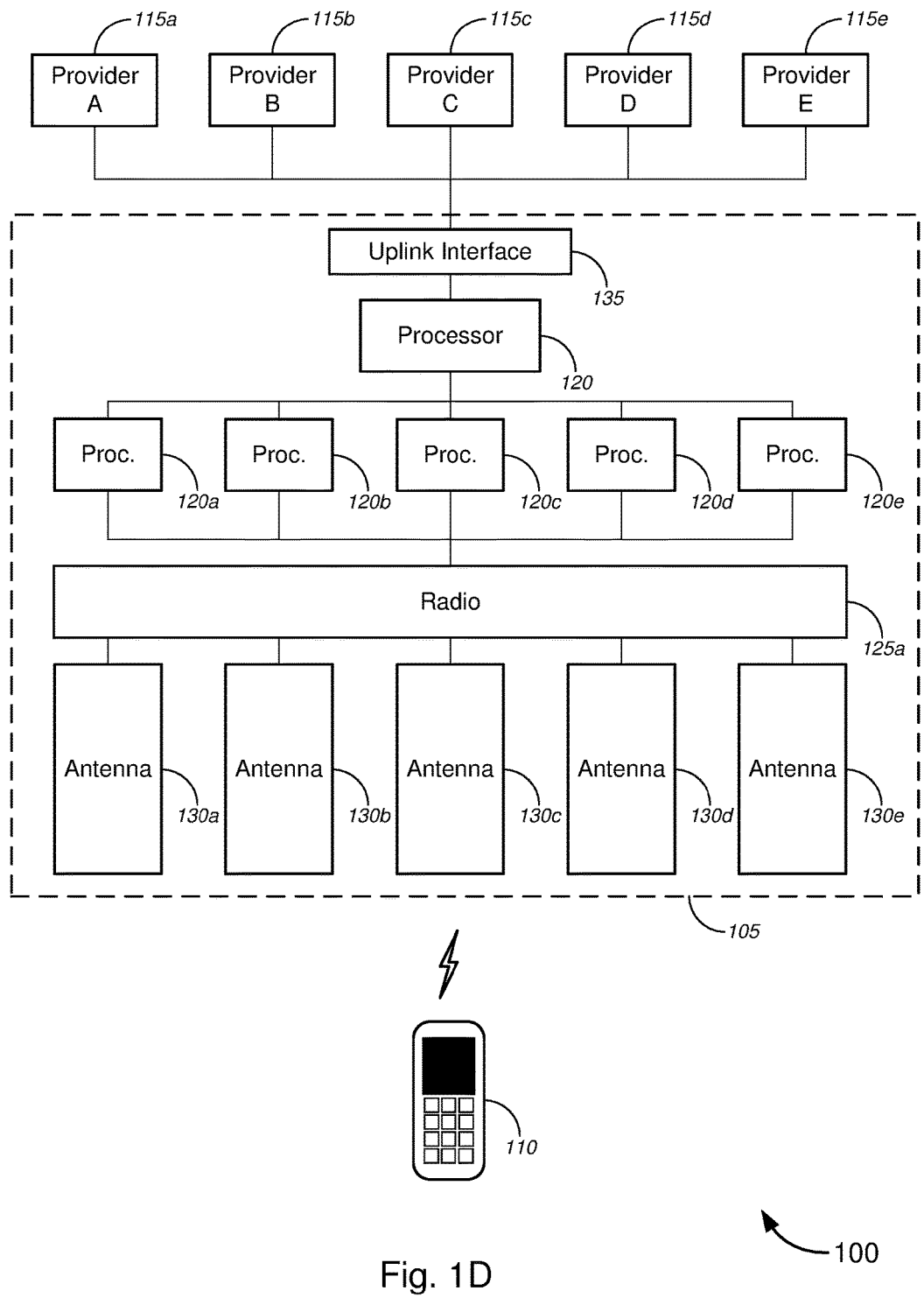

In some cases, an access point might include additional or modified features to enhance the ability of the access point to provide service on behalf of multiple providers. Merely by way of example, FIG. 1D illustrates a multi-service provider wireless access point 105 that features multiple processors 120a-120e, each of which can be assigned for the use of a respective provider 115a-115e. These processors 120a-120e might be separate, discrete processors, or they might be separate virtual processors (i.e., separate virtual machines) within a virtual machine ("VM") environment maintained by the wireless access point 105. In any case, the access point 105 might include a separate processor 120 to provide overall control and management of the access point 105, and in a virtualized environment, this processor 120 might host all of the virtual machines/virtual processors 120*a*-120*e*. (In other embodiments, no separate processor 120 might be included, and the overall management of the access point 105 can be handled by one of the processors 120*a*-120*e* or shared between multiple processors. In an aspect, each of the processors 120*a*-120*e* can share a storage medium (not shown on FIG. 1D but similar to the medium illustrated on FIGS. 1A-1C) via separate partitions, virtualization etc., and/or each of the processors 120*a*-120*e* can have its own dedicated storage medium). Similarly, each of the processors 120*a*-120*e* might be in communication (either through a master processor 120 or directly) with the uplink interface 135 and/or the radio(s) 125. In an aspect, the uplink interface can provide a dedicate communication link (e.g., VPN) between each provider 115*a*-115*e* and that provider's respective processor 120*a*-120*e* (whether the processors are physical or virtual).

Figure 1E:
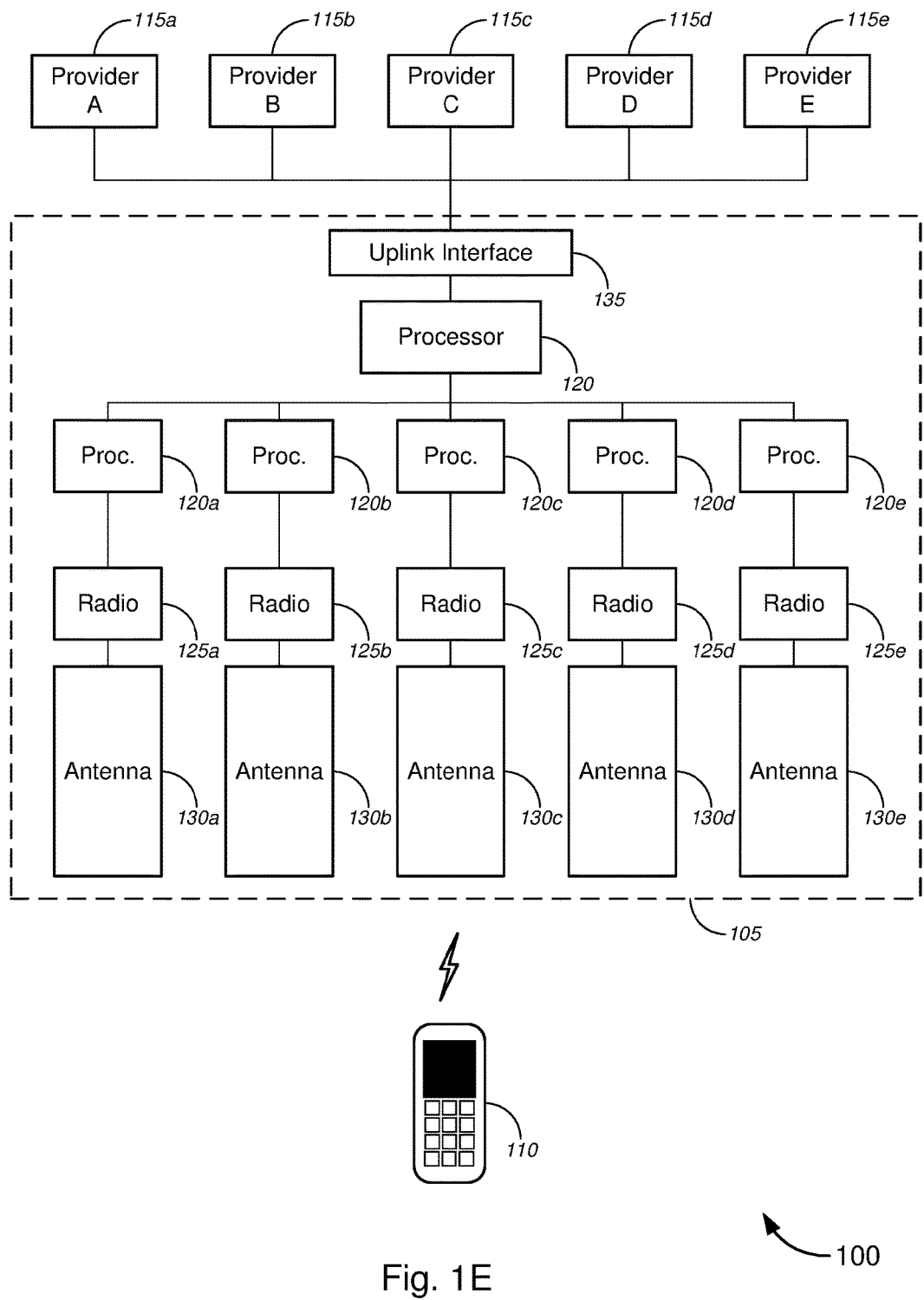

As noted above, a wide variety of configurations of radios and antennas are possible, and this is true for multi-processor access points as well. Merely by way of example, the access point 105 illustrated by FIG. 1D employs a single radio 125 (which might be a software-defined radio, etc.) that can provide service for each of the providers. (In some cases, the master processor 120 might intermediate communications between the provider-specific processors 120*a*-120*e* and the radio 125, such that the master processor is logically disposed between the provider specific processors 120*a*-120*e* and the radio 125 although the access point 105 is not so illustrated in FIG. 1D, so as to manage access to the radio 125 and prevent congestion.) In other cases, the access point 105 might feature multiple radios 125*a*-125*e*, for example as illustrated in FIG. 1E. In that case, each provider-specific processor 120*a*-120*e* might have direct communication with its own respective radio 125*a*-125*e*, as illustrated. (In some cases, a software defined-radio might feature multiple virtual radios, similar to a VM environment, in which case a single physical radio might provide a logical arrangement as depicted in FIG. 1E.)

Figure 1F:
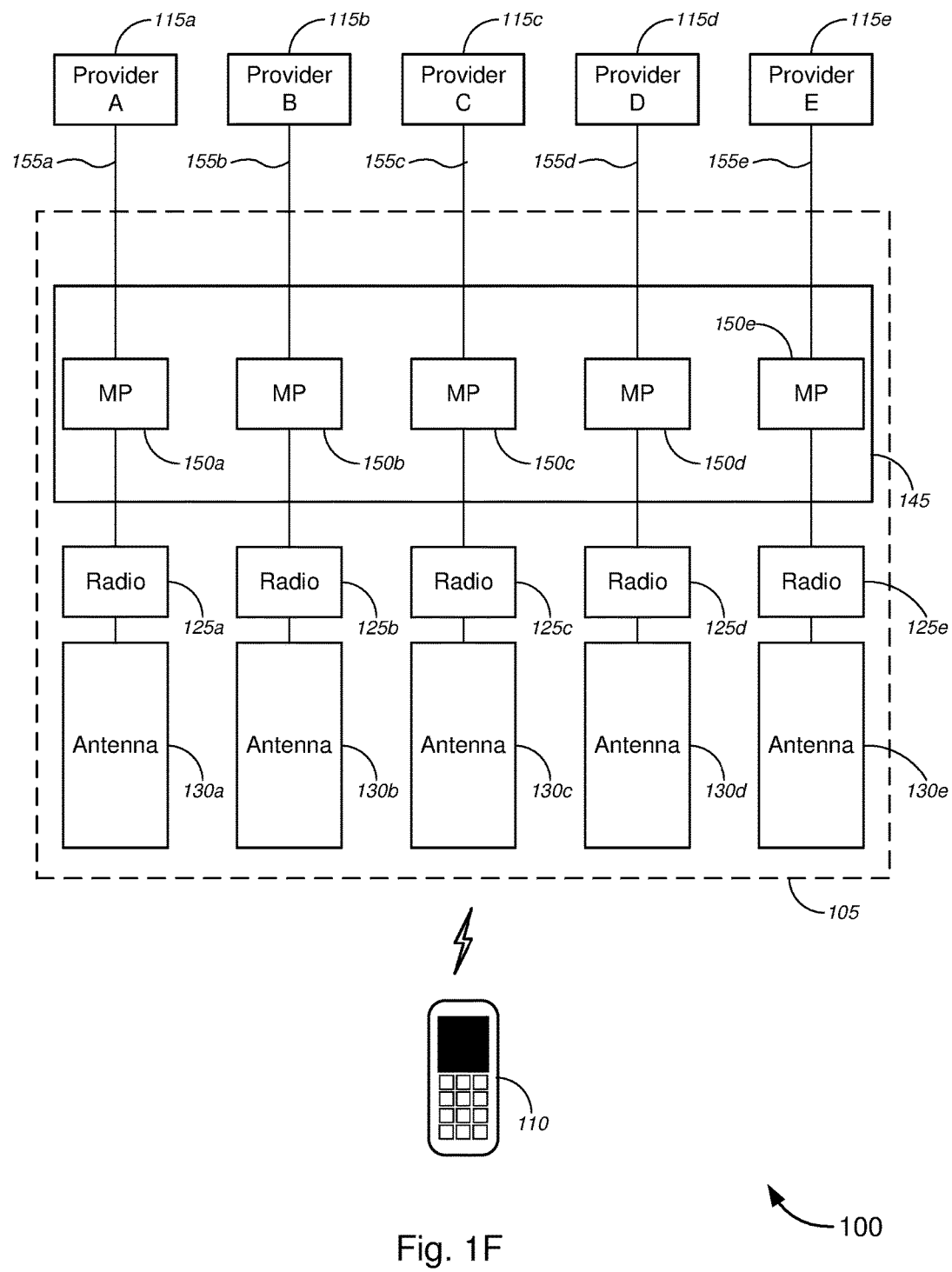

In another aspect, certain embodiments can offer each provider a dedicated management platform, as noted above, to allow each provider to manage the services provided on behalf of the provider though the access point. Hence, FIG. 1F illustrates a functional arrangement of a multi-service provider wireless access point 105. This arrangement can be supported by any of the physical arrangements illustrated by FIGS. 1A-1E above (and/or any other suitable physical arrangement).

As shown in FIG. 1F, the multi-provider wireless access point 105 supports five different providers 115*a*-115*e* (although embodiments can support any reasonable number of providers 115). In particular embodiments, the access point 105 includes a general management platform 145, which can be used to access overall access point management functions, such as hardware diagnostics, general configuration, setup for a new provider, and/or the like. For example, in one aspect, the general management platform 145 can manage routing of communications between a subscriber and that subscriber's provider. For instance, when a wireless communication is received on a radio 125, the general management platform can determine (e.g., as described above) which provider is associated with that communication and can route that communication to that provider (for example, over a dedicated link to that provider). The general management platform 145 can also manage statistics collection, e.g., as described in further detail below.

The general management platform can perform a variety of administrative and management functions as well. Merely by way of example, in some cases, the general management platform can manage common wireless radio capabilities, such as monitoring general radio functionality, managing base computing capabilities (memory, processor load, etc.), managing virtual hypervisor platform capabilities, whether bare metal or software based, in a VM-based environment (e.g., assignment/allocation of platform resources), managing common virtual private network capabilities. (I.e., VPN tunnel size, routing, etc.), managing overall security of the wireless access point and/or any of the provider-specific processing systems.

In other aspects, the general management platform 145 can provide alarms to the operator of the access point, and/or one or more of the wireless service providers, if any non-optimal conditions are detected with radios, hardware, etc. Such alarms might be provided by the general management platform interface and/or interfaces with any particular provider. In other cases, the alarms can be provided by messaging (electronic mail, text, SMS, etc.) either through the uplink interface or through the radios themselves, or both. The general management platform 145 can also monitor and/or manage other nearby equipment, such as electrical power, battery back-up, tower lights, heating and/or cooling equipment, etc. and provide appropriate alarms or notifications if any unusual conditions are detected.

The general management platform 145 can perform a number of other administrative and or supervisory tasks. Merely by way of example, in an aspect, general management platform 145 can perform and/or provide an interface for the basic FCAPS (Fault, Configuration, Accounting, Provisioning and Surveillance) capabilities. In some cases, the general management platform 145 can act as a logging repository, capturing any or all relevant processing events, and providing a historical record thereof. This logging could include post-event processing and the routing of specific logged information to wireless providers and the access point provider. The general management platform 145 can also act to perform specialized functions such as providing 'free access' (e.g., over WiFi, etc.) to certain subscribers for a period of time.

Alternatively and/or additionally, the general management platform 145 might perform traffic management. For example, the general management platform 145 could manage the priority of traffic of one service provider's (e.g., 115*a*) subscriber traffic over another provider's (e.g., 115*b*) traffic, depending on the business arrangement that exists between the provider of the wireless access point 105 and the respective service providers 115. Merely by way of example, one of the service providers (e.g., 115*a*) may pay more in order to be the anchor tenant and will receive preferential treatment during periods of congestion, and the general management platform 145 could accommodate this relationship. In other aspects, the general management platform 145 may be capable of load balancing capacity over multiple service providers. The platform 145 could also be used to configure a minimum level of performance/capacity for all service providers. The general management platform 145 could be configured prioritize GETS (Government Emergency Telecommunications Service) traffic in an emergency, etc. The general management platform 145, in some embodiments, can track usage and/or provide indicators when certain thresholds are exceeded. In other embodiments, the general management platform 145 can manage transmit power levels in response to various conditions such as increasing the cell size (e.g., by increasing transmit power) to provide more offloading of an adjacent service provider cell site or other access node in periods of heavy load. A communication channel could be established to communicate such information when necessary (e.g., via the uplink interface and/or one or more radios).

In another aspect, the general management platform 145 might be configured to monitor the performance of backhaul link (e.g., the dedicated links to each provider through the uplink interface) in terms of latency and jitter to ensure sufficient service level agreements ("SLA") are met to support services offered through the multi-service provider access point 105. Appropriate alarms can be generated to trigger appropriate corrective actions.

The general management platform 145 can comprise a management interface and/or any necessary supporting hardware, firmware, or software architecture. In one aspect, the interface might be a graphical user interface, which, for example, could be provided by a web portal hosted by the wireless access point 105. Alternatively and/or additionally, the interface might be an API or a machine-to-machine interface that can accept input from other network elements, a software client running on a remote computer, etc. In an aspect, the interface can be accessed through an uplink interface (not shown on FIG. 1F but illustrated on FIGS. 1A-1E). In some cases, the uplink interface might support a VPN between the general management platform 145 and an operator of the wireless access point (who, as noted above, might be one of the participating wireless providers 115 or might be a separate entity), such that the general management platform 145 (and/or, more precisely, the interface thereto) is accessible to the operator/provider thereof via the VPN. In another embodiment, a separate management interface may be employed to provide out-of-band management access through a separate physical link, which could be wired or wireless.

In some cases, the wireless access point 105 can also include discrete management platforms 150a-150e for each of the wireless service providers 115a-115e, respectively; each of these platforms 150a-150e can be securely accessible (e.g., via a VPN through the uplink interface) by the respective provider 115a-115e to which it is assigned. These management platforms 150a-150e, which can be architecturally similar to the general management platform 145, can be hosted by discrete processors (either virtual or physical) assigned to each of the participating providers 115a-115e (as described above) and/or can be in communication with the appropriate provider via dedicated communication links 155a-155e, respectively. The discrete management platforms 150 can provide their respective providers with the ability to manage various aspects of the wireless service provided on behalf of each provider. Merely by way of example, a management platform 150 can receive configuration data from a provider 115 and can configure one or more of the radios 120 based on that configuration data. In a particular aspect, this configuration can be used by the provider 115 to implement a radio coordination scheme with the provider's other wireless facilities, as described in further detail below.

Figure 2:
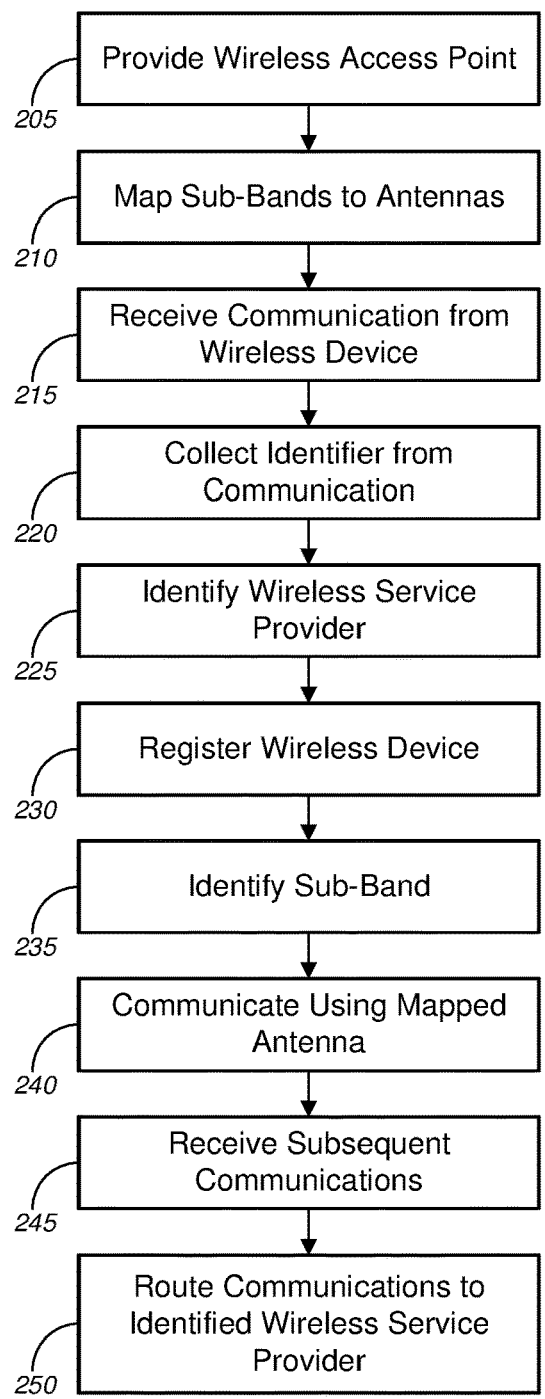
FIGS. 2 and 3 are process flow diagrams illustrating methods of providing wireless services for multiple service providers through a single access point, in accordance with various embodiments.
Figure 3:
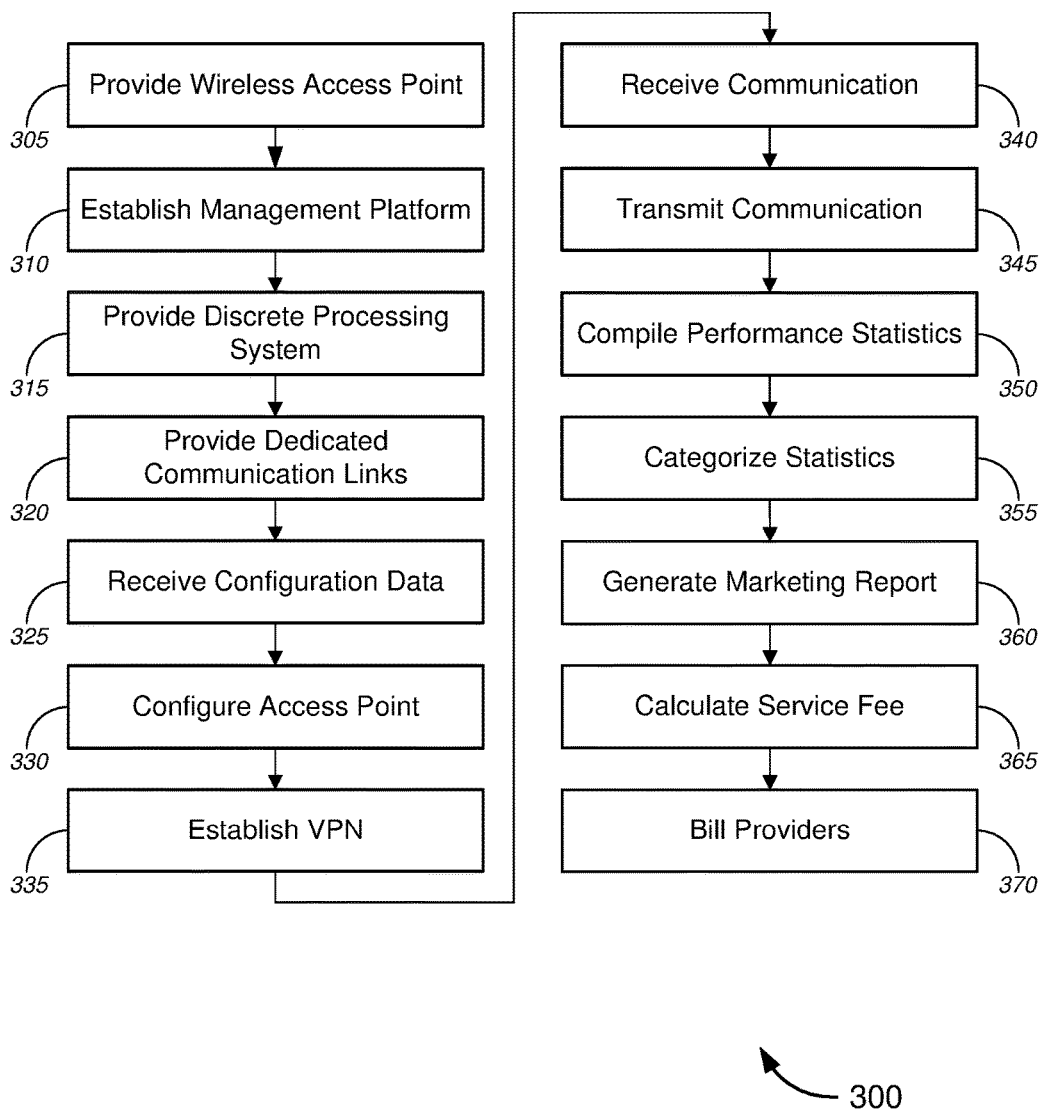

FIGS. 2 and 3 illustrate various methods that can be used to provide wireless service through a multi-service provider wireless access point (such as the access points described above). While the methods of FIGS. 2 and 3 are illustrated, for ease of description, as different methods, it should be appreciated that the various techniques and procedures of these methods can be combined in any suitable fashion, and that, in some embodiments, the methods depicted by FIGS. 2 and 3 can be considered interoperable and/or as portions of a single method. Similarly, while the techniques and procedures are depicted and/or described in a certain order for purposes of illustration, it should be appreciated that certain procedures may be reordered and/or omitted within the scope of various embodiments. Moreover, while the methods illustrated by FIGS. 2 and 3 can be implemented by (and, in some cases, are described below with respect to) the system 100 of FIGS. 1A-1F (or components thereof), these methods may also be implemented using any suitable hardware implementation. Similarly, while the system 100 of FIGS. 1A-1F (and/or components thereof) can operate according to the methods illustrated by FIGS. 2 and 3 (e.g., by executing instructions embodied on a computer readable medium), the system 100 can also operate according to other modes of operation and/or perform other suitable procedures.

In that light, FIG. 2 illustrates a method 200 of providing wireless service for multiple service providers from a single access point, in accordance with one set of embodiments. While the techniques and procedures of the method 200 are depicted and/or described in a certain order for purposes of illustration, it should be appreciated that certain procedures may be reordered and/or omitted within the scope of various embodiments. Moreover, while the method 200 can be implemented by (and, in some cases, are described below with respect to) the systems illustrated by FIGS. 1A-1C (or components thereof), these methods may also be implemented using any suitable hardware implementation. Similarly, while those systems (and/or components thereof) can operate according to the method 200 (e.g., by executing instructions embodied on a computer readable medium), the systems can also operate according to other modes of operation and/or perform other suitable procedures.

The method 200 might comprise providing a multi-service provider wireless access point (block 205). The access point, in one aspect, might having one or more radios to communicate with wireless devices and an uplink connection to a plurality of wireless service providers. Providing an access point can comprise any of a variety of operations, such as installing the access point, providing power and/or network connectivity for the access point, communicating with the access point (e.g., via the uplink connection), and/or the like. Broadly stated, any operation related to the installation, setup, operation, and/or maintenance of an access point can be considered providing the access point.

As noted above, an access point radio in certain embodiments might employ OFDMA modulation. In some such embodiments, the method 200 might comprise mapping one or more OFDMA sub-bands to one or more antennas (block 210), such that when a sub-band is mapped to a particular antenna, the radio employs that antenna to communicate on that sub-band. A number of techniques can be used to map antennas to sub-bands. Merely by way of example, in some cases, the method might include identifying certain antennas in an antenna array that provide enhanced communication performance for a particular sub-band, for example, based on site-specific RF characteristics, antenna length (as compared to the sub-band frequency), etc. The antenna(s) identified as providing enhanced communication for a particular sub-band might then be mapped to that sub-band.

In some embodiments, the radio(s) might be configured to transmit signals on particular bands in a round-robin basis, transmitting on one band, then the next, etc., or according to some other algorithm that may provide priority to a particular wireless service provider in a particular band. The radio can also listen for an access request from a client radio (e.g., a wireless device). Once a request to access the network is received, the multi-service provider access point can adjust its timing/algorithms so as to appropriately service the call. If only one wireless service provider is using the access point, all resources can be dedicated to that service provider. The algorithm can be dynamically adjusted based on a variety of parameters, including but not limited to, the number of service providers sharing the access point, the number of client radios accessing the access point, contracted service provider priorities, received signal strength, signal-to-noise ratio ("SNR")/interference indicators, etc. In other words, the access point can be treated as a pooled resource among all the service providers that are sharing it. The access point can also be configured to provide a subscribed minimum level of access per wireless provider and dynamically share remaining resources across wireless providers.

As illustrated, the method 200 further comprises receiving, at the multi-service provider wireless access point, a communication from a wireless device (block 215). For instance, in an embodiment, the communication from a wireless device might comprise a conventional wireless registration message. More broadly, the communication from the wireless device can be any communication that provides sufficient information for the multi-service provider wireless access point to identify the device, as described further below. In some cases, the communication might be a response to an interrogating communication from the multi-service provider wireless access point itself.

In some embodiments, the method 200 further comprises collecting, e.g., at the multi-service provider wireless access point, an identifier of the wireless device from the communication (block 220). The identifier can comprise any data that can be used to identify the wireless device. Merely by way of example, the identifier might comprise the telephone number assigned to the wireless device. Alternatively, the identifier might comprise the mobile identification number ("MIN") of the wireless device, the electronic serial number ("ESN") of the wireless device, a media access control ("MAC") address, or any other identifier that is sufficiently unique to permit identification of the wireless device.

The method 200 can further include, at block 225, identifying a wireless service provider serving the wireless device; after the wireless service provider has been identified, the multi-service provider wireless access point can register the wireless device with the wireless service provider's network (block 230). A number of techniques can be used to identify the wireless service provider. For example, in some cases, the communication from the wireless device might include information identifying the wireless service provider. In other cases, however, the service provider can be identified, at least in part, based on the identifier of the wireless device.

For example, some embodiments maintain a database that correlates wireless device identifiers (whether the mobile telephone number, the MIN, the ESN, or another identifier) with wireless service providers. In some embodiments, the method 200 might comprise storing the database on the multi-service provider wireless access point. In other embodiments the database might be stored at any other suitable location accessible by the multi-service provider wireless access point. Hence, the database might be remote from the multi-service provider wireless access point, and/or the method 200 might comprise accessing the database over the uplink connection.

The database might be populated based on data provided by the wireless service providers themselves and/or by data obtained through other sources. Such databases might be replicated among a plurality of multi-service provider wireless access points. In one aspect, the database might include a record for a plurality of wireless devices, and the record might include a field that lists one or more wireless place identifiers for that wireless device and a field that contains the identity of the wireless service provider that provides service for that wireless device. The wireless device identifier field might be a key field in the database, such that the wireless access point can access the database and search the database for a record containing the identifier the wireless device; that record will include an identifier of the wireless service provider.

In some cases, the method comprises identifying a sub-band (e.g., an OFDMA sub-band) for communications between the access point and the wireless device (block 235). Any of a number of factors can be used to identify a sub-band for communications between the multi-service provider wireless access point and the wireless device. Merely by way of example, in some cases, the wireless device might only be capable of communicating on a particular sub-band, which generally would be the sub-band on which the multi-service provider wireless access point received the original communication from the wireless device, and the sub-band can be identified as the sub-band on which the original communication was received.

Alternatively and/or additionally, the multi-service provider wireless access point might identify the sub-band based on the frequency range that is allocated to the wireless service provider that serves the wireless device (which can be identified, e.g., as described above). In this way, for example, the multi-service provider wireless access point can select a sub-band that is appropriate for the wireless device and corresponding provider. In such embodiments, identifying the sub-band might comprise accessing a database that correlates wireless service providers with allocated frequency ranges. (This database might be the same database the correlates wireless identifiers with wireless service providers and/or might be a different database. As a general matter, the database(s) described herein might be distributed, replicated, tiered, hierarchical, or organized/arranged in any other suitable manner.)

The method then might further comprise searching the database for a record corresponding to the identified wireless service provider; that record, then, would have a field identifying one or more frequency ranges allocated to that wireless service provider, and the multi-service provider wireless access point then could choose a sub-band corresponding to that frequency range. (It should be noted, of course, that in communications originating from the service provider, the identity of the service provider can be determined from such communications, either implicitly, e.g., based on the source address of the communication packets, or explicitly, based on some identifier provided with the communications.)

As noted above, the identified sub-band might be mapped to one or more antennas of the access point, and the method 200 can further include, at block 240, communicating with the wireless device using the antenna(s) mapped to the identified sub-band.

In some aspects, the method 200 might further comprise receiving, at the multi-service provider wireless access point, one or more subsequent communications from the wireless device (block 245), and/or routing, from the multi-service provider wireless access point, the one or more subsequent communications to the identified wireless service provider (block 250), e.g., over the uplink connection. Merely by way of example, the uplink connection might comprise a packet data connection (e.g., an Ethernet, Multiprotocol Label Switching ("MPLS), or other Internet Protocol ("IP") connection). The multi-service provider wireless access point, then, might packetize the communications received from the wireless device, address the packets to a network address corresponding to the identified wireless service provider, and transmit the packets (comprising the subsequent communications) over the uplink connection. Using standard routing techniques, those packets then would be routed to the appropriate wireless service provider. By the same token, packets received from the wireless service provider would be transmitted (e.g., using the radio, the sub-band, and/or the antenna appropriate for that wireless service provider and/or wireless device) for reception by the wireless device.

FIG. 3 illustrates another method 300 of providing wireless service through a multi-service provider wireless access point. At block 305, the method 300 comprises providing a wireless access point. In one aspect, providing a wireless access point can comprise any of a variety of operations, for example, as discussed above with respect to block 205 of FIG. 2.

At block 310, the method 300 comprises establishing one or more management platforms. In a particular aspect, this operation can comprise establishing, for each of the of service providers participating in the access point, a dedicated management platform for each service provider to manage wireless service provided by that service provider. In another aspect, this operation can comprise establishing a general management platform, separate from each of the dedicated management consoles, for managing the wireless access point. With respect to either the general management platform or the provider-specific management platforms, the management platform might provide an interface for the respective provider (and/or access point operator) to interact with the (physical or virtual) hardware of the access point. A variety of such interfaces are possible within the scope of different embodiments. Merely by way of example, the interface might include one or more application programming interfaces ("API"), a machine-to-machine interface (e.g., with XML as a transport mechanism), a server interface for dedicated clients running on other machines, and/or the like. The interface can be provided over one or more VPNs specific to the operator of the access point or any respective participating provider (depending on which management platform is at issue), and such a VPN can be established through uplink interface, as described above, and/or through any of the radios of the wireless access point.

In a particular aspect, the interface might comprise a user interface for direct interaction between a user (e.g., an administrator or operator of the wireless service provider and/or access point provider) and the management platform. This interaction may be either unsecured or secured using any appropriate type of encryption or other security method (e.g., certificate-based encryption, secure sockets layer ("SSL"), etc. For example, the user interface can be used to output information for a user, e.g., by displaying the information on a display device, printing information with a printer, playing audio through a speaker, etc.; the user interface can also function to receive input from a user, e.g., using standard input devices such as mice and other pointing devices, motion capture devices, touchpads and/or touchscreens, keyboards (e.g., numeric and/or alphabetic), microphones, etc. The procedures undertaken to provide a user interface, therefore, can vary depending on the nature of the implementation; in some cases, providing a user interface can comprise displaying the user interface on a display device; in more typical cases, however, in which the user interface is displayed on a device remote from the wireless access point (such as on a client computer, wireless device, etc.), providing the user interface might comprise formatting data for transmission to such a device and/or transmitting, receiving and/or interpreting data that is used to create the user interface on the remote device (e.g., through the uplink interface and/or radios, over a VPN, etc. Alternatively and/or additionally, the user interface on a client computer (or any other appropriate user device) might be a web interface, in which the user interface is provided through one or more web pages that are served from a web server executing on the access point (and/or a web server in communication with the access point), and are received and displayed by a web browser on the client computer (or other capable user device). The web pages can display output from the access point and/or receive input from the user (e.g., by using Web-based forms, via hyperlinks, electronic buttons, etc.). A variety of techniques can be used to create these Web pages and/or display/receive information, such as JavaScript, Java applications or applets, dynamic HTML and/or AJAX technologies, to name but a few examples.

In many cases, providing a user interface will comprise providing one or more display screens for receiving configuration information for access point management and/or displaying status information (e.g., using a dashboard display that can illustrate current values of various parameters and statistics), notifications, alarms, etc. Such display screens can include one or more user interface elements. As used herein, the term "user interface element" (also described as a "user interface mechanism" or a "user interface device") means any text, image, or device that can be displayed on a display screen for providing information to a user and/or for receiving user input. Some such elements are commonly referred to as "widgets," and can include, without limitation, text, text boxes, text fields, tables and/or grids, menus, toolbars, charts, hyperlinks, buttons, lists, combo boxes, checkboxes, radio buttons, and/or the like. It should be appreciated that the choice of user interface elements for a particular purpose is typically implementation-dependent and/or discretionary.

As noted above, in an aspect of certain embodiments, the user interface provides interaction between a user and a computer system. Hence, when this document describes procedures for displaying (or otherwise providing) information to a user, or to receiving input from a user, the user interface may be the vehicle for the exchange of such input/output.

Returning to FIG. 3, the method 300 can further comprise providing discrete processing systems for each of the providers (block 315). In an aspect, the discrete processing system can allow each provider to provide wireless service for its respective subscribers. As noted above, such processing systems can be separate physical processing systems for a provider and/or can be virtualized processing systems within a VM environment. Hence, providing a discrete processing system for a particular provider can include establishing a virtual processing system within the VM environment, assigning such a virtual processing system to a particular provider, assigning physical resources to a particular provider, and/or the like.

It should be noted as well that not every embodiment need provide such separate processing systems. In some cases, a single processing system might manage all access point functionality, and for example, multiple providers might be able to log into that single processing system using different authentication credentials, and each provider might be authorized only to perform configuration on those aspects of the access point that do not affect the other providers or general access point functionality.

At block 320, the method 300 might comprise providing dedicated communication links for each of the participating providers. As noted above, in one aspect, such a dedicated communication link can comprise a VPN between the wireless access point (and/or a discrete processing system or management platform thereof) and the provider. Hence, providing such a dedicated communication link can comprise establishing a VPN (and/or virtual local area network ("VLAN")) between the access point (and/or discrete processing system, which might have its own IP address, for example) and a host operated by the provider. A number of different virtual private networking techniques (including, for example, pseudo-wires, VLAN tagging, point-to-point tunneling, layer 2 VPNs ("L2VPN"), and/or the like) might be suitable for such applications, and any such technologies can be used as appropriate to establish the dedicated communication link between the access point and the provider. Similar techniques can be used to establish a dedicated communication link between the access point (and/or a general management platform thereof) and an operator of the access point.

At block 325, the method 300 can comprise receiving configuration data from one or more of the participating providers. (Generally, each provider might have its own configuration data that is specific to the resources of the access point assigned to that provider.) In one aspect, such configuration data can be received by the discrete management platform for a particular provider at the interface assigned to that provider (e.g., over a dedicated communication link). Such information may be received as a text file, as machine to machine data, as a binary upload, as user input provided to a webpage or other user interface, and/or using any other appropriate mode of information exchange. The configuration data can include any of a variety of different types of instructions for controlling operation of the wireless access point (and/or of those resources, such as processing systems, radios, antennas, etc. assigned to a particular provider). Merely by way of example, in one set of embodiments, configuration data might comprise instructions to turn on a radio, turn off a radio, enable and/or disable communication on various frequencies, tune networking and/or wireless service parameters, and/or the like.

As another example, one or more radios at the wireless access point might support a number of different wireless standards, and the configuration data might specify a particular standard (or version thereof, such as WiFi, LTE Release 8 Release 9, Release 10, etc.) to which transmissions from that provider's radio should conform. As a further example, a particular provider might have implemented a radio coordination scheme in that provider's wireless network. Such a radio coordination scheme can require particular configurations of each radio within the network, to optimize network performance, handoff between different access points, and/or the like. In a particular embodiment, the configuration data can enable the provider to integrate the wireless access point within that radio coordination scheme. In some cases, such configuration might, for example, require establishment of a separate dedicated link (e.g., VPN) to a particular network point in the provider's network to transport traffic in accordance with the radio coronation scheme.

The method 300, then, can further comprise configuring various resources of the access point (e.g., one or more radios assigned to the provider, the provider's discrete processing system, etc.) based on the received configuration data (block 330). For instance, returning to the examples above, configuring the wireless access point might comprise configuring one or more radios to communicate using the specified standard (or version therefore), to operate in accordance with the specified coordination scheme, etc. In other cases, configuring the access point might comprise establishing one or more additional dedicated links (e.g., VPNs) to accommodate a specified radio coordination scheme (block 335).

At block 340, the wireless access point receives a communication from a wireless subscriber, and at block 345, the method 300 comprises transmitting that communication to the appropriate provider that serves that subscriber. The method 200, described above in conjunction with FIG. 2, describes an exemplary process of receiving a communication from wireless subscriber and routing that communication to the appropriate wireless provider, and such a process can be used to receive such communication and transmit communication to the appropriate provider in the context of the method 300 as well.

Alternatively and/or additionally, if a particular radio is assigned to a particular provider, and/or is in communication with a particular provider's discrete processing system, such communication might be received and routed by that discrete processing system without requiring the provider identification techniques described in conjunction with FIG. 2. In this way, for example, some embodiments can function effectively as multiple dedicated access points with a dedicated radio (physical or virtual) controlled by and communicating with a dedicated processing system (physical or virtual), which communicates with the provider's network over a dedicated communication link. Various hybrids of these two techniques can be implemented as well. Merely by way of example, a received communication might be examined by a general management platform to determine the provider associated with that communication, and the communication then could be provided to the discrete processing system of that provider, which would transmit the communication over the dedicated link to its provider. In this way, for example, the general management platform could maintain overall responsibility for routing of incoming communications.

In some embodiments, the method 300 comprises compiling performance statistics (block 350). In some aspects, the general management platform might collect such statistics, which can include any data related to performance and/or usage of the wireless access point by subscribers. Examples of statistics that can be collected include, without limitation, traffic statistics (e.g., bytes in/out, connections made, lost, etc., errored transmissions/receptions, and/or the like, which can be assessed for peak and/or average numbers by time-of-day, day-of-week, etc.), indications of capacity available and/or consumed, peak traffic periods, identifying information (e.g., device identification, such as wireless device MAC address, SIM identifier, IMEI, IP address, etc.; carrier identification), session time, total number of sessions, mobile device location (geocode) information, direction and/or distance of a mobile device from the access point, signal quality, transmission type, and/or the like. In an aspect of some embodiments, statistics can be gathered not only for subscribers of participating providers, but also for subscribers of other carriers (even if those subscribers are not authorized to communicate through the wireless access point at that time). Registration requests and other communications from such devices can be compiled and identified (e.g., by carrier).

The method 300 might further comprise categorizing such statistics (block 355). Merely by way of example, statistics can be categorized by provider, for example by collecting all statistics into a table and filtering the table by a provider identifier associated with each communication. After segregating statistics by provider, the provider-specific statistics can be communicated to each respective provider, for example by displaying the statistics on a dashboard in the provider's management interface, emailing statistics to the provider, injecting the statistics into logs or other records, and/or the like. Because statistics can be collected for all devices communicating with the wireless access point, provider-specific statistics can be compiled even for carriers that currently do not participate in the wireless access point. In particular, such statistics can be analyzed to determine how many of that carrier's subscribers have attempted to indicate with the wireless access point, and/or the performance that the access point would be able to provide to that carrier's subscribers.

Thus, in an aspect of some embodiments, the method 300 comprises generating a marketing report (block 360). The marketing report can include statistics about a nonparticipating carrier's subscribers, and can be used to persuade that carrier that it should participate in the wireless access point to better service its own subscribers. Information provided within the marketing report could include any of the statistics noted above and/or collected by the access point, in any type of format such as reports, charts, etc., counts of unsuccessful registrations or attempts by nonparticipating carrier's customers; counts of free access given; session attempt times, etc. Such a marketing report can then be provided to personnel of the access point operator, who can approach the nonparticipating carrier to seek a business relationship with that carrier. In some embodiments, the wireless access point might be configured to obtain location information on serviced mobile devices (e.g., based on triangulation of the device, GPS or other location data received from the device, etc.). In such embodiments, maps can be generated based on mobile location to demonstrate coverage area of the cell. That information can also be further sub-categorized to show data rates at that particular distance, so the data rate contours can be generated to further characterize coverage and performance to service providers contemplating whether to participate.

In some cases, the method 300 can comprise calculating a service fee (block 365) for one or more of the participating providers. Some embodiments, for example charge providers a fee for providing wireless service through the access point. Such fees can be based on any number of factors. Merely by way of example, in some cases, a provider might be charged a flat, periodic (e.g., monthly, annual, etc.) fee for unlimited usage of the wireless access point. In other cases, such fees might be usage-based. Merely by way of example, a fee charged to a provider might be based, at least in part, on an amount of data traffic (either downstream, upstream, and/or both) handled by the wireless access point on behalf of the provider over a particular billing period. In another embodiment, the fee might be based, at least in part, on a number of subscribers serviced, a number of wireless minutes provided, on a type of service provided (WiFi, 3G, LTE, etc.), on a time of day and/or day of week in which service is provided, on a quality of service (e.g., real-time delivery, best effort delivery, etc.). In some cases, there may be pricing tiers based on one more of these factors, and/or the calculated fee might be based on a combination of factors. For instance, the access point provider might charge a flat monthly fee plus a price per GB of WiFi traffic, plus another price per GB of LTE traffic.

At block 370, then, the method 300 can comprise billing one or more of the providers for use of the wireless access point (and/or, more particularly, for service provided on behalf of the provider through the wireless access point). Any number of techniques can be used to bill a provider for use of the wireless access point. Merely by way of example, in some cases, the access point might provide usage statistics to a billing computer (e.g., a mainframe, transaction processor, etc.) in the access point provider's network, which then might produce electronic and/or paper invoices and submit those invoices using in a standard manner on a periodic basis. Any number of billing arrangements are possible in accordance with various embodiments.

Figure 4:
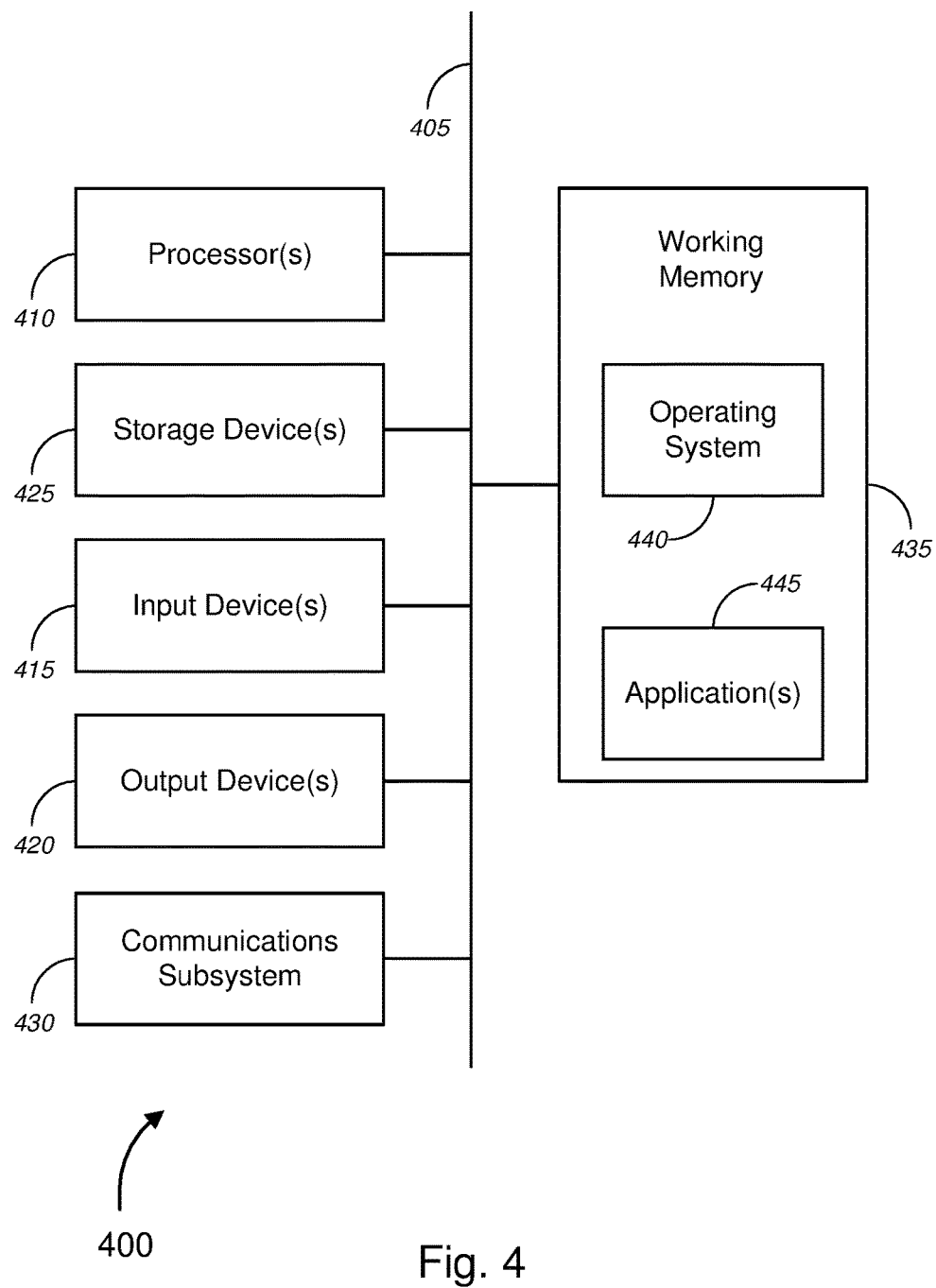
FIG. 4 is a generalized schematic diagram illustrating a computer system, in accordance with various embodiments.

FIG. 4 provides a schematic illustration of one embodiment of a computer system 400 that can perform the methods provided by various other embodiments, as described herein, and/or can function as the processing system of a multi-service provider wireless access point, a web server for providing a management interface, a computer for managing features of the wireless access point, and/or the like. It should be noted that FIG. 4 is meant only to provide a generalized illustration of various components, of which one or more (or none) of each may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include one or more processors 410, including without limitation one or more general-purpose processors and/or one or more special-purpose processors (such as digital signal processing chips, graphics acceleration processors, and/or the like); one or more input devices 415, which can include without limitation a mouse, a keyboard and/or the like; and one or more output devices 420, which can include without limitation a display device, a printer and/or the like.

The computer system 400 may further include (and/or be in communication with) one or more storage devices 425, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 400 might also include a communications subsystem 430, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 430 may permit data to be exchanged with a network (such as the network described below, to name one example), with other computer systems, and/or with any other devices described herein. In many embodiments, the computer system 400 will further comprise a working memory 435, which can include a RAM or ROM device, as described above.

The computer system 400 also may comprise software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another computer readable medium, such as one or more of the storage device(s) 425. Merely by way of example, execution of the sequences of instructions contained in the working memory 435 might cause the processor(s) 410 to perform one or more procedures of the methods described herein.

The terms "machine readable medium" and "computer readable medium," as used herein, refer to any medium that participates in providing data that causes a machine to operation in a specific fashion. In an embodiment implemented using the computer system 400, various computer readable media might be involved in providing instructions/code to processor(s) 410 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 425. Volatile media includes, without limitation, dynamic memory, such as the working memory 435. Transmission media includes, without limitation, coaxial cables, copper wire and fiber optics, including the wires that comprise the bus 405, as well as the various components of the communication subsystem 430 (and/or the media by which the communications subsystem 430 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc. carried by the signals) to the working memory 435, from which the processor(s) 405 retrieves and executes the instructions. The instructions received by the working memory 435 may optionally be stored on a storage device 425 either before or after execution by the processor(s) 410.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of providing wireless service for multiple service providers from a single access point, the method comprising:
   providing a multi-service provider wireless access point having one or more radios to communicate with wireless devices and an uplink interface to provide an uplink connection to a plurality of wireless service providers;
   establishing, for each of the plurality of wireless service providers, a dedicated management platform for each wireless service provider to manage wireless service provided by that wireless service provider;
   providing a plurality of dedicated communication links, each of the plurality of dedicated communication links providing secure communication between the uplink interface and one of the wireless service providers;
   receiving, via a first dedicated communication link, configuration data from the one of the wireless service providers;
   configuring one or more radios assigned to the one of the wireless service providers based on the received configuration data; and
   establishing one or more virtual private networks ("VPNs") via the one or more configured radios assigned to the one of the wireless service providers.

2. The method of claim 1, wherein the one or more radios comprise one or more long term evolution ("LTE") radios.

3. The method of claim 1, wherein the one or more radios comprise one or more WiFi radios.

4. The method of claim 1, wherein the one or more radios comprise one or more software defined radios.

5. The method of claim 1, further comprising:
   receiving, via the first dedicated communication link, configuration data from each of one or more other wireless service providers of the plurality of wireless service providers;
   configuring one or more second radios assigned to each of the one or more other wireless service providers based on the received configuration data; and
   establishing one or more second VPNs via the one or more configured second radios assigned to the one or more other wireless service providers.

6. The method of claim 1, further comprising:
   providing, for each of the plurality of wireless service providers, a discrete processing system to provide wireless service to subscribers of each respective wireless service provider.

7. The method of claim 1, further comprising:
   establishing a general management platform, separate from each of the dedicated management consoles, for managing the multi-service provider wireless access point.

8. The method of claim 1, wherein the uplink interface comprises an Ethernet interface, and wherein each of the dedicated communication links comprises a VPN tunnel between the multi-service provider wireless access point and a wireless service provider associated with that dedicated communication link.

9. The method of claim 1, wherein the configuration data implements a radio coordination scheme of the one of the wireless service providers, and wherein establishing one or more VPNs comprises establishing one or more VPNs to support the radio coordination scheme.

10. The method of claim 1, wherein the configuration data specifies a version of a wireless communication standard, and wherein configuring one or more radios comprises configuring the one or more radios to communicate using the specified version of the wireless communication standard.

11. The method of claim 1, further comprising:
    receiving communications from a plurality of wireless devices;
    compiling performance statistics based on communications from the plurality of wireless devices; and
    categorizing the performance statistics by wireless service provider.

12. The method of claim 11, wherein the plurality of wireless devices comprises one or more devices associated with a non-participating wireless service provider other than the plurality of wireless service providers.

13. The method of claim 12, further comprising:
    generating a marketing report for the non-participating wireless service provider, the marketing report comprising statistics about subscribers of the non-participating wireless service provider capable of accessing the multi-provider wireless access point.

14. The method of claim 1, further comprising:
    calculating, with a computer, a service fee for each of the plurality of wireless service providers; and
    billing each of the plurality of wireless service providers the respective service fee.

15. The method of claim 14, wherein the service fee for at least one of the wireless service providers is a periodic flat fee.

16. The method of claim 14, wherein the service fee for at least one of the wireless service providers is a usage fee calculated from one or more data elements selected from at least one of periodic airtime, periodic data transfer, aggregate number of calls, time of day, day of week, or traffic type.

17. A multi-service provider wireless access point, comprising:
    one or more radios to communicate with wireless devices;
    an uplink interface to provide an uplink connection with a plurality of dedicated communication links;
    one or more processors in communication with the one or more radios and the uplink interface; and
    a non-transitory machine readable medium having encoded thereon a set of instructions executable by the one or more processors to cause the multi-service provider wireless access point to:

establish, for each of the plurality of wireless service providers, a dedicated management platform for each wireless service provider to manage wireless service provided by that wireless service provider;

provide the plurality of dedicated communication links, each of the plurality of dedicated communication links providing secure communication between the uplink interface and one of the wireless service providers;

receive, via a first dedicated communication link, configuration data from the one of the wireless service providers;

configure one or more radios assigned to the one of the wireless service providers based on the received configuration data; and establish one or more virtual private networks ("VPNs") via the one or more configured radios assigned to the one of the wireless service providers.

18. The multi-service provider wireless access point of claim 17, wherein the one or more processors is a plurality of processors, and wherein the plurality of processors comprises one or more processors dedicated to each wireless service provider, to provide each wireless service provider with a discrete processing system to provide wireless service to subscribers of each respective wireless service provider.

19. The multi-service provider wireless access point of claim 17, wherein the one or more processors are configured to support a plurality of virtual machines, and wherein the plurality of virtual machines comprises one or more virtual machines dedicated to each wireless service provider, to provide each wireless service provider with a discrete processing system to provide wireless service to subscribers of each respective wireless service provider.

* * * * *